April 15, 1924.
R. KOENIG
1,490,568
COMBINATION FRYING PAN AND COOKER
Filed May 26, 1922
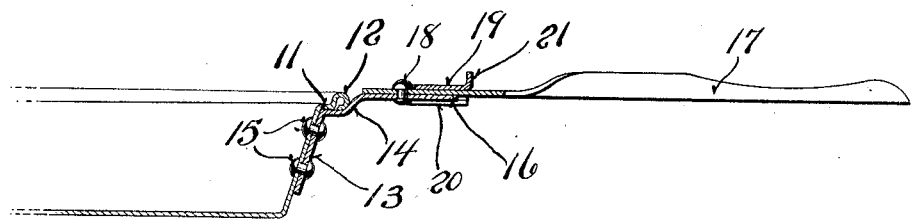
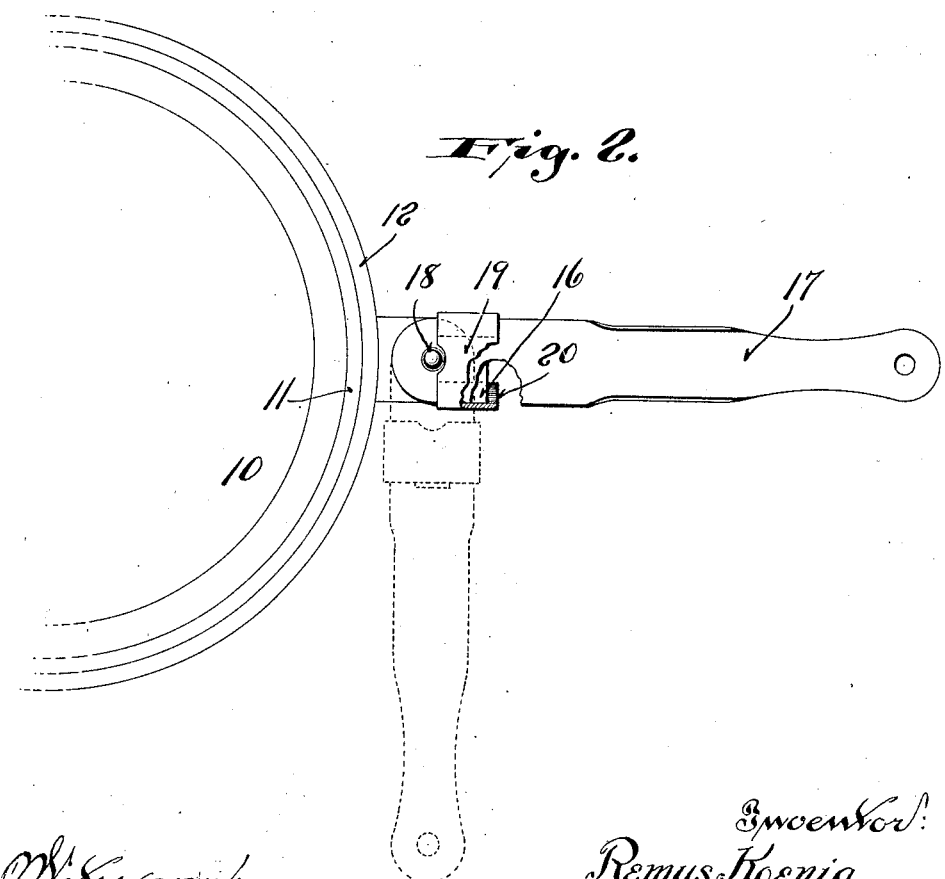

Patented Apr. 15, 1924.

1,490,568

UNITED STATES PATENT OFFICE.

REMUS KOENIG, OF TWO RIVERS, WISCONSIN.

COMBINATION FRYING PAN AND COOKER.

Application filed May 26, 1922. Serial No. 563,824.

*To all whom it may concern:*

Be it known that I, REMUS KOENIG, a citizen of the United States, and resident of Two Rivers, in the county of Manitowoc and State of Wisconsin, have invented certain new and useful Improvements in Combination Frying Pans and Cookers; and I do hereby declare that the following is a full, clear, and exact description thereof.

The invention relates to a cooking utensil adapted for use both as a frying pan and a roaster. It comprises a pan having an annular offset adapted to receive a cover, and a handle movable to occupy a position close to the pan.

A primary object of the invention is the provision of a utensil which may be used as a frying pan, in which case the handle is directed radially outward as in the case of the ordinary frying pan, and which is readily convertible into a roaster, the handle being rotated to an inner position so as to occupy less room and the pan receiving a cover on an annular offset, whereby a complete roaster is formed.

When in frying pan position, the handle is locked securely, so that the device may be used for ordinary frying pan purposes without danger of spilling the contents and with all the conveniences of the ordinary frying pan.

With the above and other objects in view which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing, is illustrated one complete example of the physical embodiment of the present invention constructed according to the best mode so far devised for the practical application of the principles thereof, and in which:

Figure 1 is a sectional elevation of the utensil when used as a frying pan.

Figure 2 is a plan thereof, with parts broken away, the position of the handle when the device is used as a roaster being indicated in dotted lines.

Pan 10 has the shape and appearance of the ordinary frying pan, except that it is provided with a horizontal annular offset 11, terminating in an annular bead 12. An arm 13 of bracket 14 is secured to the conical surface of the pan by means of rivets 15, and its horizontal radially extending portion 16 has secured thereto, the end of a handle 17 by means of a pivot pin 18.

When used for frying pan purposes, retainer 19 occupies the position shown. The retainer grips handle 17 and bracket 14, being provided with horizontal oppositely disposed flanges 20 in a plane parallel to the top portion of the retainer. A lip 21 is struck up, to which the thumb or finger may be applied for moving the retainer into the locking position, wherein it effectively grips the bracket and handle; and retains them in aligned relationship. By means of the lift, the retainer may be moved outwardly so as to unlock the handle from bracket 14. The handle may then be rotated to the position shown in dotted lines in Figure 2, so that the device will occupy less room and may be readily placed in an oven, being used as a roaster.

When used for roasting purposes, a cover may be positioned on offset 11 and retained securely in position, so as to form a completely closed receptacle, bead 12 operating to prevent lateral movement of the cover.

I claim:

The combination of a frying pan, a bracket secured thereto and having an outwardly projecting flat portion, a handle having a flat face resting on the flat portion of said bracket, a pivot pin extending through said handle and said bracket at right angles to said face, a retainer slidable on said handle, and operable to grip said bracket, and a lip on said retainer, whereby said retainer may be reciprocated to lock or unlock said handle on said bracket.

In testimony that I claim the foregoing I have hereunto set my hand at Two Rivers, in the county of Manitowoc and State of Wisconsin.

REMUS KOENIG.